(12) United States Patent
Humphrey et al.

(10) Patent No.: US 6,246,681 B1
(45) Date of Patent: Jun. 12, 2001

(54) SYSTEM AND METHOD FOR PLANE SELECTION

(75) Inventors: Russell L. Humphrey, McKinney; Jose A. Garcia, Rowlett; Long V. Vo, Garland, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/994,315

(22) Filed: Dec. 19, 1997

(51) Int. Cl.[7] ................................................ H04L 12/66
(52) U.S. Cl. .................. 370/389; 370/354; 370/355; 370/356; 370/386; 370/412
(58) Field of Search ................... 370/351, 352, 370/353, 354, 355, 356, 389, 428, 429, 228, 386, 412, 419

(56) References Cited

U.S. PATENT DOCUMENTS

| | | | |
|---|---|---|---|
| 4,899,337 | * 2/1990 | Hirai | 370/428 |
| 5,274,633 | * 12/1993 | Kato et al. | 370/219 |
| 5,311,510 | * 5/1994 | Moriue et al. | 370/428 |
| 5,311,517 | * 5/1994 | Senoo | 370/428 |
| 5,438,567 | * 8/1995 | Ikeda | 370/417 |
| 5,485,453 | 1/1996 | Wahlman et al. . | |
| 5,555,244 | 9/1996 | Gupta et al. . | |
| 5,555,265 | * 9/1996 | Kakuma et al. | 370/395 |
| 5,745,488 | * 4/1998 | Thompson et al. | 370/395 |
| 5,745,491 | * 4/1998 | Ando et al. | 370/428 |
| 5,838,677 | * 11/1998 | Kozaki et al. | 370/389 |
| 5,878,044 | * 3/1999 | Frischknecht et al. | 370/466 |
| 5,920,412 | * 7/1999 | Chang | 359/128 |
| 5,953,344 | * 9/1999 | Dail et al. | 370/443 |

* cited by examiner

*Primary Examiner*—Ajit Patel
*Assistant Examiner*—Bob A. Phunkulh
(74) *Attorney, Agent, or Firm*—Baker Botts L.L.P.

(57) ABSTRACT

A system for selecting one of two or more parallel planes of data is provided. The system includes a first data buffer that is connected to a first data bus that carries a stream of datagrams. The first data buffer receives and stores datagrams from the first data bus. The system also includes a second data buffer that is connected to a second data bus that carries a stream of datagrams. The second data buffer receives and stores datagrams from the second data bus. A selection controller connected to the first data buffer and the second data buffer analyzes the datagrams stored in the first and second data buffers, and selects one of the datagrams to be the primary datagram.

17 Claims, 8 Drawing Sheets

SYSTEM AND METHOD FOR PLANE SELECTION

TECHNICAL FIELD OF THE INVENTION

The present invention relates in general to telecommunications data switching and more particularly to a system and method for selecting one of two or more redundant planes of data.

BACKGROUND OF THE INVENTION

Modern telecommunications system typically utilize digitally encoded data instead of analog data. If analog data is used, it may be converted to digital data for the purposes of switching the data between conducting media. Switching of data occurs at large telecommunications switches, which may receive and process hundreds or thousands of data channels.

To improve switching reliability, two or more redundant planes of data may used. In the event that one of the planes is interrupted or corrupted, one of the remaining planes of data may be used. In this manner, the transmission of data may continue without interruption.

Despite the known practice of using two or more redundant planes of data to improve switching reliability, data may still be lost when a transfer is made between redundant planes. In particular, known redundant data plane schemes for switches may be designed to maintain overall system reliability while tolerating some loss of data. Although such switching schemes may be an improvement over switches that lack redundant data planes, those switching schemes still result in the unavoidable loss of data.

SUMMARY OF THE INVENTION

Therefore, a need has arisen for a system and method for data plane selection that allows switching between redundant data planes without the loss of any data.

In accordance with the present invention, a system and method for data plane selection is provided that substantially eliminates or reduces disadvantages and problems associated with previously developed systems and methods for data plane selection.

One aspect of the present invention is a system for selecting one of two or more parallel planes of data. The system includes a first data buffer that is connected to a first data bus that carries a stream of datagrams. The first data buffer receives and stores datagrams from the first data bus. The system also includes a second data buffer that is connected to a second data bus that carries a stream of datagrams. The second data buffer receives and store datagrams from the second data bus. A selection controller connected to the first data buffer and the second data buffer analyzes the datagrams stored in the first and second data buffers, and selects one of the datagrams to be the primary datagram.

The present invention provides many important technical advantages. One important technical advantage of the present invention is a system for selecting one of two or more redundant planes that allows planes to be switched on a packet-by-packet basis. If a switch from one plane to another plane is required during the transmission of data, the selected data output will not be lost or corrupted.

Another important technical advantage of the present invention is a method for selecting one of two or more data planes that allows planes to be switched on a packet-by-packet basis. The method of the present invention may be implemented in many suitable systems that use two or more redundant planes of data.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Preferred embodiments of the present invention are illustrated in the figures, like numbers being used to refer to like and corresponding parts of the various drawings.

Figure 1:
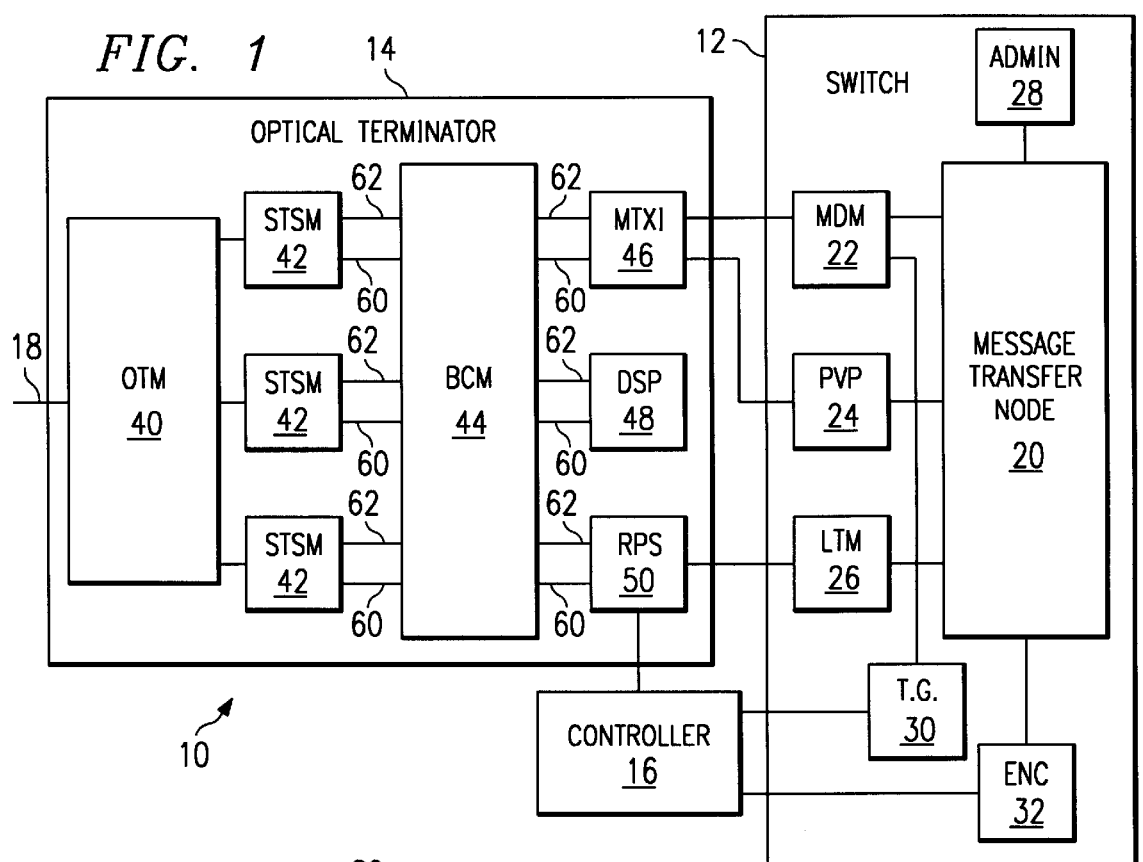
FIG. 1 is a block diagram of an optical fiber-capable telecommunications switch system embodying concepts of the present invention.

FIG. 1 is a block diagram of optical fiber-capable telecommunications switch system 10 embodying concepts of the present invention. In particular, the data bus interface of the present invention is a modular system that is incorporated into individual telecommunications components, such as the individual components of telecommunications switch system 10. The data bus interface of the present invention may also or alternatively be used in other telecommunications components that interface to data buses.

Optical fiber-capable telecommunications switch system 10 includes switch 12 connected to fiber optic connection unit (OPTICAL TERMINATOR) 14 and common controller 16. Optical telecommunications data streams, such as one or more streams of bit-serial data, byte-serial data, or serial frames of data, are received over one or more fiber optic conductors 18 at fiber optic connection unit 14. These telecommunications data streams are converted to electrical signals by fiber optic connection unit 14 and are transmitted to switch 12 for switching between data channels. Switch 12 may switch data channels of any suitable size, such as DS-0, DS-1, DS-3, or other suitable channels. Furthermore, any stream of data may comprise one or more channels of data having a suitable format, such as DS-0, DS-1, DS-3, or other suitable channels. Common controller 16 receives control data from and transmits control data to fiber optic connection unit 14 and switch 12.

Switch 12 is a telecommunications switch having M input channels and N output channels, where M and N are integers. Switch 12 receives telecommunications data at any of the M input channels and transfers the telecommunications data to any of the N output channels. Switch 12, as shown in FIG. 1, is a digital switch, but may also be an analog switch. Switch 12 may include, for example, a Megahub 600E Digital Telecommunications Switch manufactured by DSC Communications Corporation of Plano, Texas. Switch 12 includes a message transport node 20 coupled to a matrix data multiplexer circuit (MDM) 22, a matrix control path verification processor (PVP) 24, a line trunk manager circuit (LTM) 26, administration circuit (ADMIN) 28, timing generator circuit (TG) 30, and Ethernet network circuit (ENC) 32.

Matrix data multiplexer circuit 22 is further coupled to matrix control path verification processor 24 and timing generator circuit 30. Matrix data multiplexer circuit 22 is an interface circuit that may be used for coupling data channels between fiber optic connection unit 14 and the switching matrix (not explicitly shown) of switch 12. In particular, matrix data multiplexer circuit 22 provides the interface for DS-0 data. Matrix data multiplexer circuit 22 receives 2048 channels of DS-0 data from fiber optic connection unit 14 on a 10-bit parallel data channel operating at a frequency of 16.384 MHZ. Any suitable number of channels, data channel format or operating frequency may be used. These DS-0 data channels are then transmitted to the M input ports of tthe switching matrix of switch 12.

Control commands received at switch 12 from common controller 16 are used to determine the proper connections between the M input ports and the N output ports of the switching matrix. The DS-0 data channels are transmitted through the switching matrix after the connections have been formed. The DS-0 data channels received at matrix data multiplexer circuit 22 from the N output ports of the switching matrix are then transmitted back to fiber optic connection unit 14.

Matrix control path verification processor 24 is coupled to fiber optic connection unit 14 and to message transport node 20. Matrix control path verification processor 24 is a switching matrix administration and control component that processes matrix channel low level fault detection and fault isolation data.

Line trunk manager circuit 26 is coupled to fiber optic connection unit 14 and message transport node 20. Line trunk manager circuit 26 is a switching matrix control component that receives and transmits data relating to call processing functions for fiber optic connection unit 14.

Timing generator circuit 30 is coupled to matrix data multiplexer circuit 22, message transport node 20, and common controller 16. Timing generator circuit 30 is a switch timing circuit that receives timing data from an external source, such as fiber optic connection unit 14, and transmits the timing data to components of switch 12.

Ethernet network circuit 32 is coupled to message transport node 20 and common controller 16. Ethernet network circuit 32 is a data communications interface, and transfers data between message transport node 20 and common controller 16.

Fiber optic connection unit 14 includes an optical interface circuit (OTM) 40, STSM circuits (STSM) 42, a bus control circuit (BCM) 44, a matrix interface circuit (MTXI) 46, a tone recognition circuit (TONE) 48, and a high speed line trunk processor circuit (LTP) 50. Fiber optic connection unit 14 receives digitally encoded optical data from fiber optic conductor 18, performs broadcast switching of the data streams received from fiber optic conductor 18, transmits synchronous transfer mode (STM) telecommunication data to matrix data multiplexer circuit 22 and matrix control path verification processor 24 for switching through the switching matrix of switch 12, and receives the switched telecommunications data from switch 12 for transmission over fiber optic conductor 18.

Optical interface circuit 40 is capable of terminating optical signals, for example OC-3, connected to the public switched network (PSN). Optical interface circuit 40 receives digitally encoded optical telecommunications data from fiber optic conductor 18 and converts the optical signals into electrical signals, for example STS-1, for transmission to other components of fiber optic connection unit 14. Optical interface circuit 40 is coupled to fiber optic conductor 18, bus control circuit 44, and to STSM circuits 42. Optical interface circuit 40 may comprise a single circuit card with electronic circuit subcomponents (not explicitly shown) that has plug-in connectors to allow the card to be easily installed in a cabinet containing other component circuit cards of fiber optic connection unit 14. Alternatively, optical interface circuit 40 may comprise two or more circuit cards, or one or more discrete components on a circuit card.

Application circuits are generally any telecommunications data transmission system components which are coupled to bus control circuit 44. Each application circuit may comprise a separate circuit card (not explicitly shown) with plug-in connectors in order to be easily installed in a rack containing fiber optic connection unit 14. Alternatively, each application circuits may comprise multiple circuit cards, or individual components on a single circuit card.

As shown in FIG. 1, STSM circuits 42 are configured to receive data from and transmit data to optical interface circuit 40. This data may comprise synchronous transfer mode telecommunications data. For example, STSM circuits 42 may receive a single STS-1P channel of data that includes a plurality of DS-0 data channels, where each DS-0 data channel is a continuous stream of data equal to 64,000 bits per second. This data would be received in a predetermined format that may include administration data, control data, routing data, and payload data. The administration data, control data, and routing data is used to separate the individual DS-0 data channels within the STS-1P data channel, and the payload data comprises the actual data carried in each individual DS-0 data channel.

STSM circuits 42 may also receive asynchronous transfer mode (ATM) telecommunications data. Asynchronous transfer mode data may be transmitted as a single stream of fixed bit format data frames that comprise additional streams of data. The number of data frames transmitted per second for a given data stream may be varied for asynchronous transfer mode data in order to accommodate fluctuations in the amount of data per stream and the number of data streams transferred.

Bus control circuit 44 may be coupled to a number of other application circuits with suitable functions, such as matrix interface circuit 46, tone recognition circuit 48, and high speed line trunk processor circuit 50. One common characteristic of all application circuits is that they transmit data to bus control circuit 44 over ingress buses 60 and receive data from bus control circuit 44 over egress buses 62.

Bus control circuit 44 receives telecommunications data from application circuits over ingress buses 60, multiplexes the data into a single broadcast data stream, and transmits the broadcast data stream over egress buses 62. In this manner, bus control circuit 44 also operates as a broadcast switching device. Each application circuit receives the broadcast data stream containing data from other application circuits, and can process selected data in a suitable manner. For example, STSM circuit 42 may transmit the data back to optical interface circuit 40 for transmission on fiber optic conductor 18 to the network. Bus control circuit 44 may comprise a separate circuit card with plug-in connectors in order to be easily used in a rack containing fiber optic connection unit 14. Alternatively, bus control circuit 44 may comprise multiple circuit cards, or individual components on a single circuit card.

Matrix interface circuit 46 provides the protocol and transport format conversion between fiber optic connection unit 14 and switch 12. Matrix interface circuit 46 is an application circuit that selects desired data channels from the broadcast data stream transmitted by bus control circuit 44, and reformats and transmits the data to switch 12. Matrix interface circuit 46 is coupled to bus control circuit 44, matrix data multiplexer circuit 22, and matrix control path verification processor 24. Matrix interface circuit 46 converts the data format of the broadcast data stream received from bus control circuit 44 and switch 12 into a data format that is compatible with switch 12 and bus control circuit 44, respectively. Matrix interface circuit 46 may comprise a separate circuit card with plug-in connectors in order to be easily used in a rack containing fiber optic connection unit 14. Alternatively, matrix interface circuit 46 may comprise multiple circuit cards, or individual components on a single circuit card.

Tone recognition circuit 48 is an application circuit that is coupled to bus control circuit 44 and performs tone recognition functions for fiber optic connection unit 14. One pair of tone recognition circuits 48 may be required for every 2016 matrix ports of switch 12. Tone recognition circuit 48 interfaces with the broadcast data stream and detects data representative of keypad tones on each DS-0 channel that comprises the broadcast data stream, up to, for example, 2016 DS-0 data channels.

Tone recognition circuit 48 has an array of digital signal processor devices (not explicitly shown) that can be configured to provide tone detection and generation. Alternatively, other methods of tone detection and generation may be used. Tone recognition circuit 48 may comprise a separate circuit card with plug-in connectors in order to be easily used in a rack containing fiber optic connection unit 14. Alternatively, tone recognition circuit 48 may comprise multiple circuit cards, or individual components on a single circuit card. The array of digital signal processors may also be used for other suitable purposes, such as echo cancellation.

High speed line trunk processor circuit 50 is the primary shelf controller for all of the circuit cards in fiber optic connection unit 14 and provides the interface between fiber optic connection unit 14 and switch 12. High speed line trunk processor circuit 50 contains a microprocessor and a communications interface to line trunk manager circuit 26.

High speed line trunk processor circuit 50 may comprise a separate circuit card with plug-in connectors in order to be easily used in a rack containing fiber optic connection unit 14. Alternatively, high speed line trunk processor circuit 50 may comprise multiple circuit cards, or individual components on a single circuit card.

Ingress buses 60 are data buses that carry a data stream with a predetermined bit structure and a predetermined frequency from an application circuit to bus control circuit 44. For example, each ingress bus 60 may comprise a data stream with 8 parallel bits operating, for example, at a frequency of 25.92 MHZ. Other bit structures and frequencies may be used where suitable.

Egress buses 62 are data buses that carry a data stream with a predetermined bit structure and a predetermined frequency to an application circuit from bus control circuit 44. For example, each egress bus 62 may comprise a data stream with 16 parallel bits operating, for example, at a frequency of 51.84 MHZ. Other bit structures and frequencies may be used where suitable.

Common controller 16 is coupled to switch 12 and fiber optic connection unit 14. Common controller 16 is a processor that receives administration, control, and routing data from switch 12 and fiber optic connection unit 14, and generates administration, control and routing data that coordinates the operation of switch 12 and fiber optic connection unit 14. Common controller 16 may alternatively be incorporated within switch 12 or fiber optic connection unit 14.

In operation, telecommunications data from the network is transmitted via fiber optic conductor 18 and received by fiber optic connection unit 14. This telecommunications data is then converted into electrical signals and transmitted through optical interface circuit 40 through STSM circuit 42 and to bus control circuit 44 over ingress bus 60. Bus control circuit 44 multiplexes the data received from each application circuit into a single data stream and broadcasts the data stream over each egress bus 62.

The broadcast data is transmitted to switch 12 through matrix interface circuit 46, where switching is performed on individual data channels. The data is then transmitted back to bus control circuit 44, where it is multiplexed into the broadcast data stream. The broadcast data stream is received at STSM circuits 42 for retransmission through fiber optic conductor 18 via optical interface circuit 40. The broadcast data may also or alternatively be transmitted to matrix interface circuit 46, tone recognition circuit 48, high speed line trunk processor circuit 50, or other suitable circuits for suitable data processing.

Figure 2:
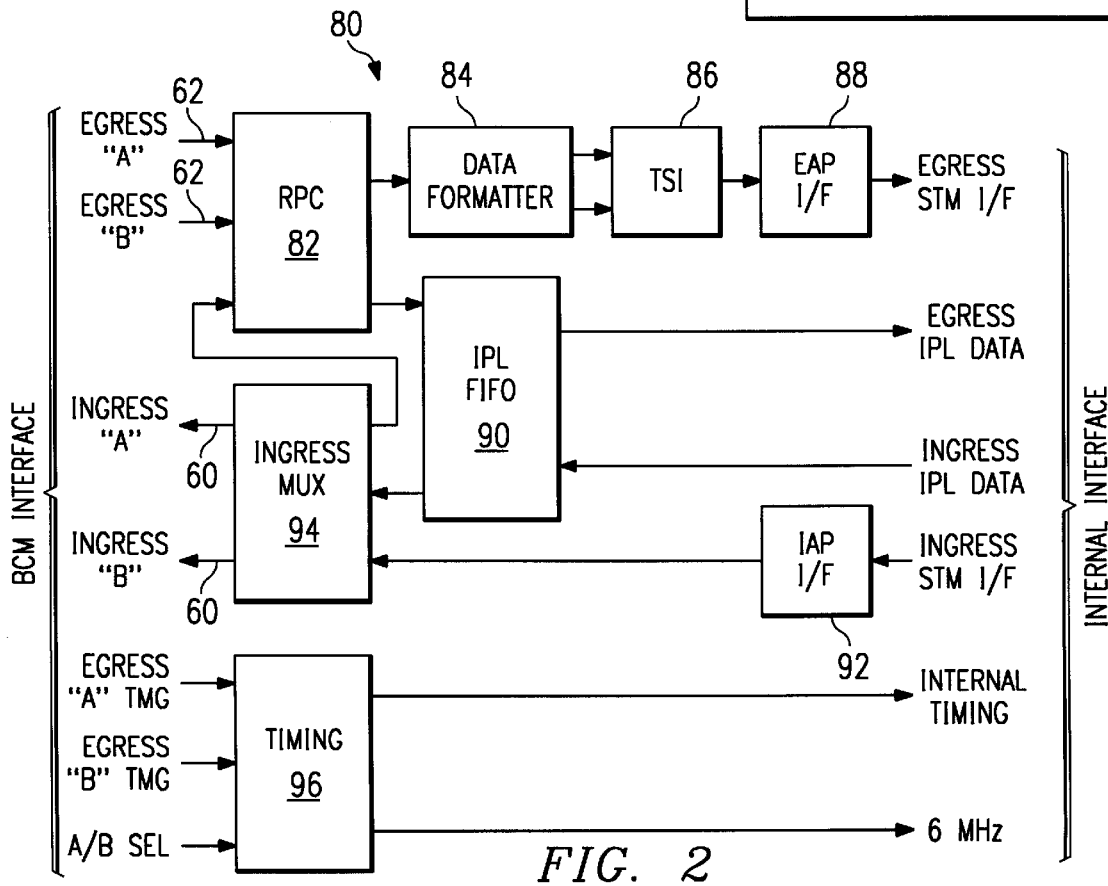
FIG. 2 is a block diagram of a bus interface system embodying concepts of the present invention.

FIG. 2 is a block diagram of bus interface system 80 embodying concepts of the present invention. Bus interface system 80 is typically a component of an application circuit, such as STSM circuits 42, matrix interface circuit 46, tone recognition circuit 48, optical interface circuit 40, or high speed line trunk processor circuit 50, and is used to interface the application circuit to ingress buses 60 and egress buses 62. In particular, bus interface system 80 is configured as a modular circuit for incorporation in an application circuit, with predetermined interfaces that allow the bus interface system 80 to be easily incorporated into any of the application circuit cards. Alternatively, bus interface system 80 may comprise a separate circuit card with plug-in connectors in order to be easily used in a rack containing fiber optic connection unit 14, as multiple circuit cards, or as individual components on a single circuit card. Bus interface system 80 may also comprise additional discrete components or a single component, such as an application-specific integrated circuit.

Bus interface system 80 receives incoming synchronous transfer mode data and incoming asynchronous transfer mode data over egress buses 62, and separates the synchronous transfer mode data from the asynchronous transfer mode data. The synchronous transfer mode data and asynchronous transfer mode data are then transmitted to the application circuit associated with the bus interface system 80. Bus interface system 80 also receives synchronous transfer mode data and asynchronous transfer mode data from an application circuit and combines the data into a single data stream for transmission over ingress buses 60.

Bus interface system 80 includes redundant path combiner circuit 82, which couples to egress buses 62, data formatter circuit 84, buffer circuit 90, and ingress multiplexer circuit 94. Redundant path combiner circuit 82 is a telecommunications data processing circuit that may comprise components such as data buffers, field programmable gate arrays (FPGAs), application-specific integrated circuits, and other suitable components. Redundant path combiner circuit 82 may incorporate, for example, a field programmable gate array manufactured by Xilinx Corporation.

Redundant path combiner circuit 82 receives a single data stream from each egress bus 62 having a 16-bit parallel structure and operating, for example, at 51.84 MHz. Other suitable bit structures and operating frequencies may also be used. The single data stream includes synchronous transfer mode data and asynchronous transfer mode data. Redundant path combiner circuit 82 separates the incoming synchronous transfer mode data from the incoming asynchronous transfer mode data. The incoming synchronous transfer mode data is transmitted in a single 36-bit parallel data stream operating, for example, at 25.92 MHz to data formatter circuit 84. Other suitable bit structures and operating frequencies may be used. The incoming asynchronous transfer mode data is transmitted in a single 33-bit parallel data stream operating, for example, at 25.92 MHz to buffer circuit 90. Other suitable bit structures and operating frequencies may be used.

Redundant path combiner circuit 82 also selects between redundant incoming data streams received from egress buses 62. For example, egress buses 62 may comprise redundant A and B planes of identical incoming data streams. Each data stream may consist of a frame header and a number of bus slots. A bus slot is a fixed size location in the incoming frame of data which may contain a packet of data. Redundant path combiner circuit 82 selects either the A plane egress bus 62 or the B plane egress bus 62, based upon such factors as data content, error content, system preset values, or external routing control commands. This selection is made on a bus slot by bus slot basis. The selection process for asynchronous transfer mode data and synchronous transfer mode data is performed independently, so that one of the redundant planes may be selected for the synchronous transfer mode data and a different redundant plane may be selected for the asynchronous transfer mode data.

Data formatter circuit 84 is a telecommunications data processing circuit that is coupled to redundant path combiner circuit 82 and time slot interchange switch circuit 86. Data formatter circuit 84 may comprise a field programmable gate array such as a Xilinx field programmable gate array, serial first-in/first-out buffer circuit, an application-specific integrated circuit, and other suitable circuitry.

Data formatter circuit 84 reformats data from a synchronous transfer mode subframe data format into a DS-0 channel data format. Data formatter circuit 84 receives a 36-bit parallel data stream operating, for example, at 32.768 MHz that include a 32-bit data package, a start of packet bit, a start-of-frame bit, an end-of-frame indicator, and a parity bit. Other suitable bit structures and operating frequencies may be used. This 36-bit data stream is alternately written into one of two first-in, first-out buffers, on a packet-by-packet basis. Two 36-bit data streams are read out of the first-in, first-out buffers simultaneously. On each 36-bit data stream read out of the first-in, first-out buffers, data formatter circuit 84 performs even parity verification over each 32-bit data word, and strips off subframe headers and cyclical redundancy code (CRC-8) data from the synchronous transfer mode subframe data format. Data formatter circuit 84 then reformats each 32-bit data stream from a 32-bit parallel data stream to a 10-bit parallel data stream including one or more DS-0 data channels.

For each DS-0 data channel, data formatter circuit 84 generates the parity for the eight bit pulse code modulated data and the one bit path verification data. The parity bit is appended to the pulse code modulated data and the path verification bit to form a 10-bit parallel DS-0 data channel. Idle data patterns are used to fill out any DS-0 data channels that are unused out of each of the pair of 4,096 DS-0 data channels output from data formatter circuit 84 to time slot interchange switch circuit 86. Data formatter circuit 84 then generates a pair of continuous 10-bit parallel data streams operating, for example, at 32.768 MHz, which are transmitted to time slot interchange switch circuit 86. Other suitable bit structures and operating frequencies may be used.

Time slot interchange switch circuit 86 is a time slot interchange digital switch having 8,192 input ports and 4,096 output ports. Time slot interchange switch circuit 86 receives data over two 10-bit parallel data streams operating, for example, at 32.768 MHz from data formatter circuit 84. Other suitable bit structures and operating frequencies may be used. This data is sequentially written to random access memory of time slot interchange switch circuit 86, which may create a delay for data transmitted through time slot interchange switch circuit 86.

Time slot interchange switch circuit 86 also interfaces to an onboard controller circuit associated with the application circuit associated with bus interface system 80 (not explicitly shown). The onboard controller circuit includes a resident microprocessor that performs management and control functions. Control commands transmitted to time slot interchange switch circuit 86 are used to determine the sequence in which data is read from the random access memory of time slot interchange switch circuit 86. Time slot interchange switch circuit 86 outputs a 10-bit parallel data stream operating, for example, at 32.768 MHZ to egress application interface circuit 88. Other suitable bit structures and operating frequencies may be used.

Egress application interface circuit 88 is a telecommunications data processing device that couples to time slot interchange switch circuit 86. Egress application interface circuit 88 receives up to 4,096 10-bit DS-0 data channels from time slot interchange switch circuit 86, and verifies the parity of each DS-0 data channel.

Egress application interface circuit 88 also extracts the path verification bit for each 10-bit DS-0 data sample channel, and performs path verification checks for each egress application stream. The path verification bit is a predetermined bit in each 10-bit DS-0 data sample channel that may be used to determine and verify path data for the DS-0 data channel. If a path verification error occurs, egress application interface circuit 88 reports the path verification error to the onboard controller circuit. Egress application interface circuit 88 strips the path verification bit from each sample and regenerates parity data for the 8-bit parallel data.

The new parity bit for the 8-bit parallel data is appended to the 8-bit stream to form a 9-bit stream.

Egress application interface circuit 88 transmits the 9-bit parallel data stream to application circuits at a speed determined by the application circuit.

Asynchronous transfer mode data is transmitted from redundant path combiner circuit 82 to buffer circuit 90. The asynchronous transfer mode data is received in an iMPAX packet layer datagram format, which is a proprietary asynchronous transfer mode data format, over a 33-bit parallel stream at a rate of 25.92 MHZ. In general, a datagram is a data packet having a predetermined bit structure. Buffer circuit 90 stores the data received from redundant path combiner circuit 82 and transmits a 33-bit parallel data stream to the attached application circuit at a speed of up to 66.7 MHZ. Other rates greater than this speed may be used.

Buffer circuit 90 also receives outgoing asynchronous transfer mode data from the application circuits from a 9-bit parallel data stream operating, for example, at the application circuit's processor clock rate. Other suitable bit structures and operating frequencies may be used. Buffer circuit 90 transmits the received outgoing asynchronous transfer mode data from the application circuits under control of the ingress multiplexer to ingress multiplexer circuit 94 in a 9-bit parallel data stream operating, for example, at 25.92 MHZ. Other suitable bit structures and operating frequencies may be used.

Ingress application interface circuit 92 is a telecommunications data processing device, and may comprise data processing equipment such as an Altera field programmable gate array. Up to 2048 DS-0 channels of outgoing synchronous transfer mode data is received from an application circuit at ingress application interface circuit 92 in a 9-bit parallel data stream operating, for example, at the ingress application data rate. Other suitable bit structures and operating frequencies may be used. Ingress application interface circuit 92 verifies the parity of the data and generates a path verification bit stream for each DS-0 channel. Ingress application interface circuit 92 then generates parity over the 8-bit parallel data and the path verification bit, and concatenates the 8-bit parallel data, the path verification bit, and the parity bit to form a 10-bit data sample.

Ingress multiplexer circuit 94 receives outgoing asynchronous transfer mode data from buffer circuit 90, and outgoing synchronous transfer mode data from ingress application interface circuit 92. Ingress multiplexer circuit 94 combines the outgoing synchronous transfer mode data and the outgoing asynchronous transfer mode data into an 8-bit parallel data stream operating, for example, at 25.92 MHZ. Other suitable bit structures and operating frequencies may be used. Ingress multiplexer circuit 94 transmits the multiplexed outgoing data over ingress buses 60 and to redundant path combiner circuit 82.

Timing circuit 96 receives either egress timing signals or external timing signals and synchronizes the internal phase lock loop with the selected timing signal. Internal timing reference signals are generated by timing circuit 96. Timing circuit 96 also synchronizes to the A plane timing signal, the B-plane timing signal, or internal timing signals, either automatically or in response to user-entered commands.

In operation, incoming synchronous transfer mode data and incoming asynchronous transfer mode telecommunications data is received in a pair of redundant 16-bit parallel data streams over egress buses 62 at bus interface circuit 80, and is transmitted to the application circuit associated with bus interface circuit 80. Bus interface circuit 80 also receives outgoing synchronous and outgoing asynchronous data from application circuits and combines the synchronous and asynchronous transfer mode data into a single data stream. This single data stream is then transmitted over ingress buses 60.

Figure 3:
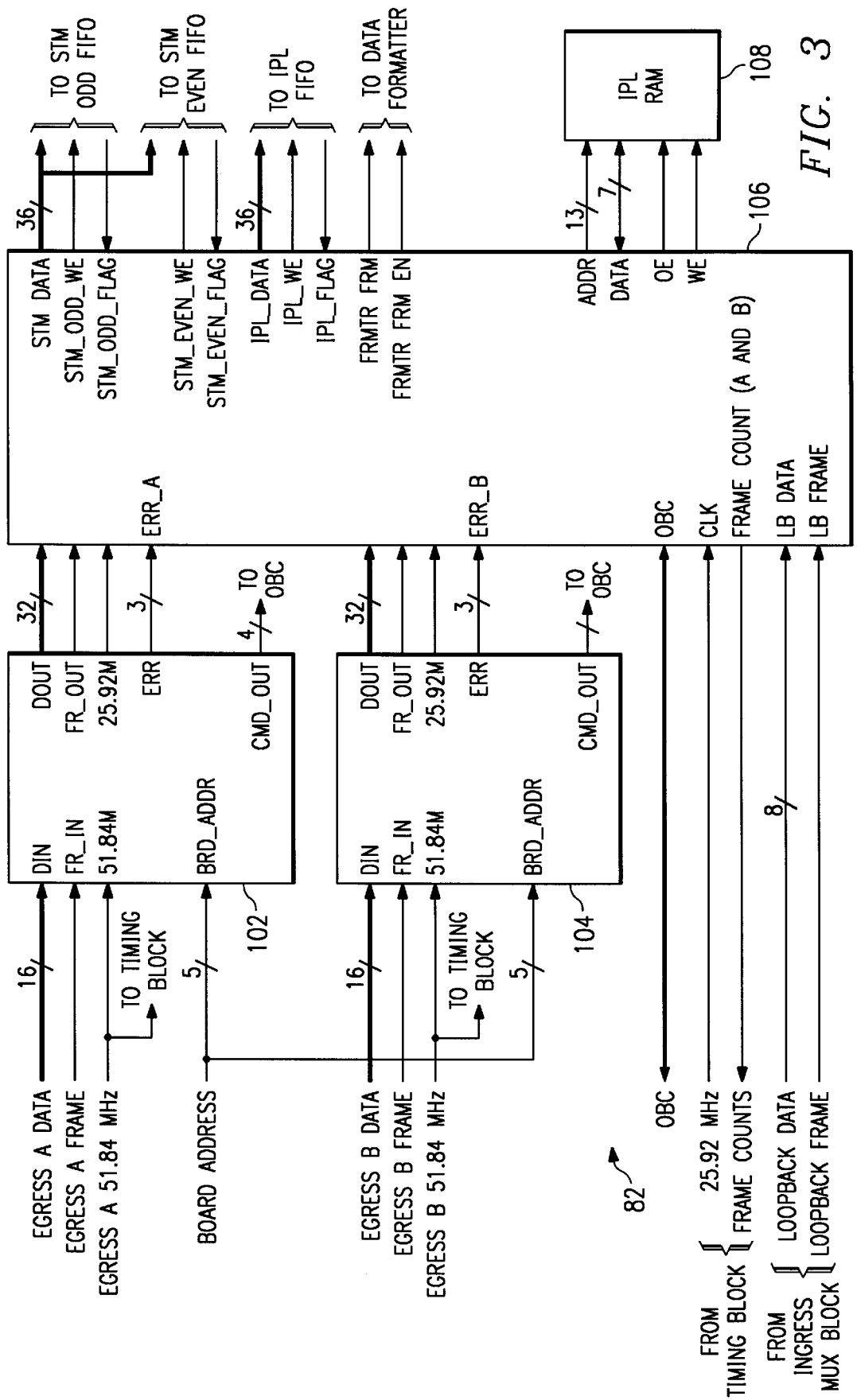
FIG. 3 is a block diagram of a redundant path combiner circuit embodying concepts of the present invention.

FIG. 3 is a diagram of redundant path combiner circuit 82 embodying concepts of the present invention. Redundant path combiner circuit 82 comprises egress front end processor A plane 102, egress front end processor B plane 104, field programmable gate array 106, and iMPAX packet layer random access memory 108. Alternatively, redundant path combiner circuit 82 may comprise additional discrete components or a single component, such as an application-specific integrated circuit.

Egress front end processor A plane 102 and egress front end processor B plane 104 are redundant devices that are each coupled to one of the egress buses 62. Egress buses 62 each transmit a 16-bit parallel data stream operating, for example, at 51.84 MHZ, a single bit egress frame stream, and a single bit 51.84 MHZ clock stream. Egress front end processor A plane 102 and B plane 104 also receive board address input bits.

Egress front end processor A plane 102 and B plane 104 each output a 32-bit parallel data stream operating, for example, at 25.92 MHZ to field programmable gate array 106. Other suitable bit structures and operating frequencies may be used. In addition, egress front end processor A plane 102 and B plane 104 output a single bit frame stream, a 25.92 MHZ clock signal stream, and an error signal stream. Egress front end processor A plane 102 and B plane 104 also put out a command output stream to the onboard controller circuit (not explicitly shown), by decoding and validating hardware command codes extracted from the egress frame headers.

Field programmable gate array 106 extracts frame header data from the A and B plane egress frame data, extracts synchronized A and B frame count fields from the header data, and validates iMPAX packet layer data packets and synchronous transfer mode subframe data packets on a packet by packet basis. Field programmable gate array 106 selects either the A plane or the B plane to be the primary data plane on a bus slot by bus slot basis. This selection may be made independently for both the synchronous transfer mode data and the asynchronous transfer mode data.

iMPAX packet layer random access memory 108 is a suitable random access memory device that is used to store iMPAX packet layer configuration data. iMPAX packet layer configuration data is used to validate incoming iMPAX packet layer data packets, for example, to verify that they are addressed to the local application card. iMPAX packet layer packet layer random access memory 108 is coupled to field programmable gate array 106.

Data received at field programmable gate array 106 is separated into synchronous and asynchronous transfer mode data. Selected synchronous transfer mode data is transmitted to a first-in/first-out buffer, where it is stored for subsequent transmission to data formatter circuit 84. Selected asynchronous transfer mode data is transmitted to buffer circuit 90.

Figure 4:
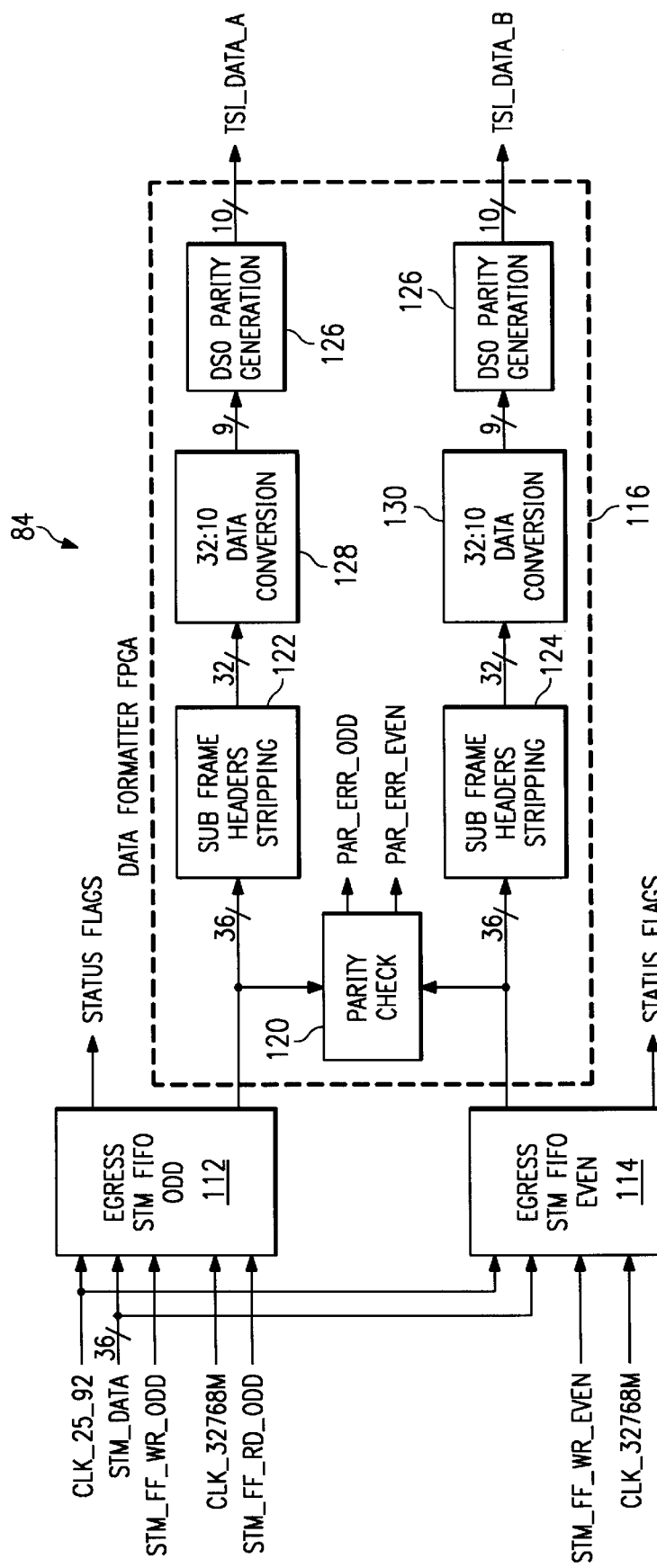
FIG. 4 is a block diagram of a data formatter circuit embodying concepts of the present invention.

FIG. 4 is a block diagram of data formatter circuit 84 embodying concepts of the present invention. Data formatter circuit 84 includes first-in/first-out buffer 112, first-in/first-out buffer 114, and data formatter field programmable gate array 116. Data formatter field programmable gate array 116 is broken down further into functional blocks, which are programmed functions within data formatter field programmable gate array 116. These functional blocks include parity check circuit 120, frame header extraction circuits 122 and 124, DS-0 parity generation circuit 126, and data conversion circuits 128 and 130. Alternatively, data formatter circuit 84 may comprise additional discrete components or a single component, such as an application-specific integrated circuit.

First-in/first-out buffers 112 and 114 each receive a 36-bit parallel data stream of synchronous transfer mode data, in addition to a clock stream. A status flag stream is also generated by first-in/first-out buffers 112 and 114 and monitored by redundant path combiner circuit 82. Synchronous transfer mode data packets are transmitted alternating on an even and odd subframe basis into first-in/first-out buffers 112 and 114 in response to control commands received from redundant path combiner circuit 82. The two data frames are read simultaneously. As each data stream is read from first-in, first-out buffers 112 and 114, a parity check is performed by parity check circuit 120.

Subframe headers are stripped off of the synchronous transfer mode data subframes by subframe header stripping circuits 122 and 124. Data conversion circuits 128 and 130 each receive the 32-bit parallel synchronous transfer mode data after the frame header is stripped off and reformat the synchronous transfer mode data into DS-0 format data. DS-0 parity generation is performed by DS-0 parity generation circuit 126. This DS-0 format data is transmitted in a 10-bit parallel data stream from data formatter circuit 84.

Figure 5:
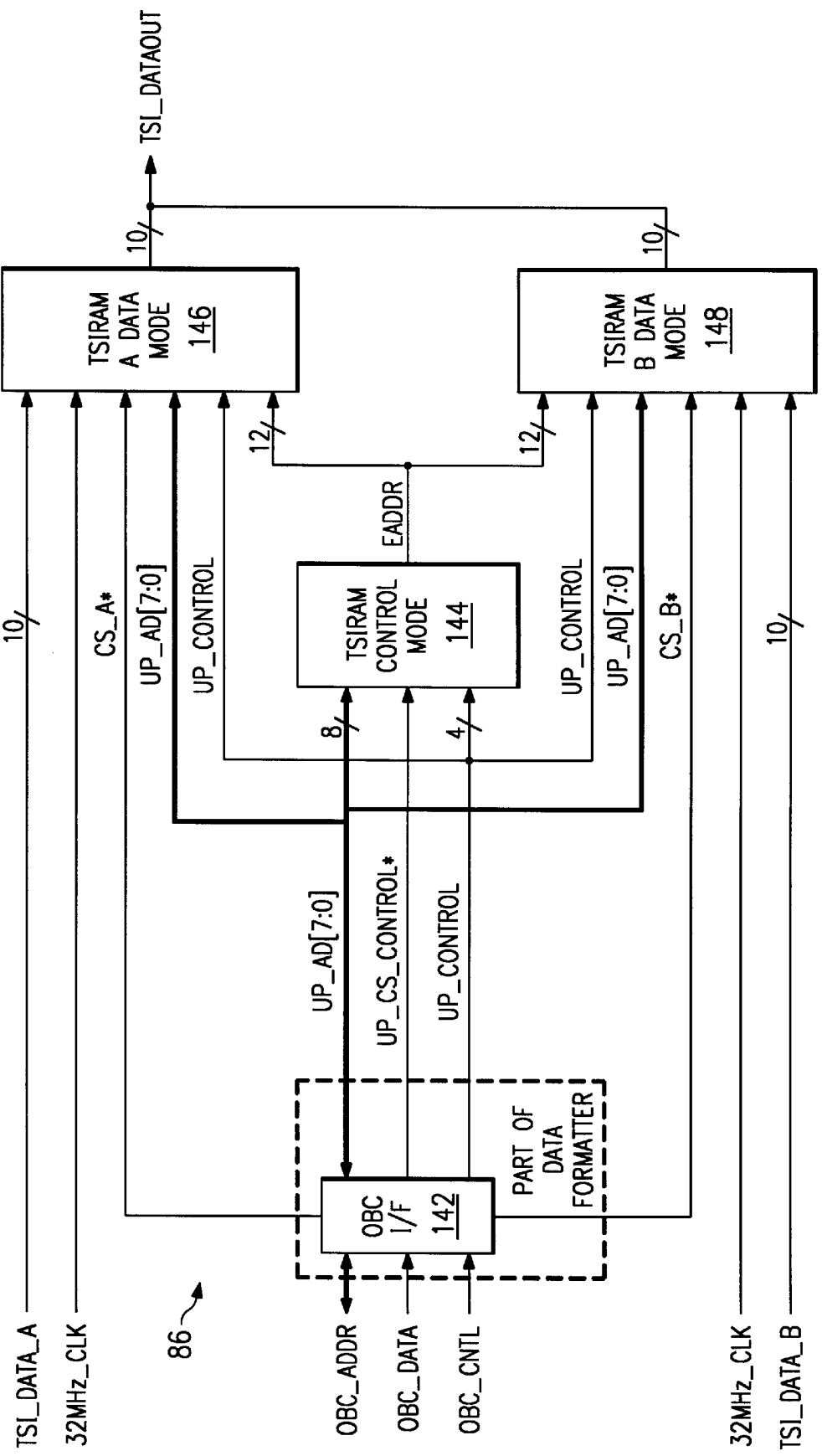
FIG. 5 is a block diagram of time slot interchange switch circuit embodying concepts of the present invention.

FIG. 5 is a block diagram of time slot interchange switch circuit 86 embodying concepts of the present invention. Time slot interchange switch circuit 86 includes onboard controller interface circuit 142 (which is physically part of data formatter field programmable gate array 116 of FIG. 4), time slot interchange random access memory control mode circuit 144, and time slot interchange random access memory data mode circuits 146 and 148.

The DS-0 synchronous transfer mode data channels transmitted from data formatter circuit 84 of FIG. 4 are received at time slot interchange random access memory data mode circuits 146 and 148. This data is sequentially stored in time slot interchange random access memory locations.

Time slot interchange random access memory control mode circuit 144 receives control data from onboard controller interface circuit 142. The data is used to switch the DS-0 data channels by selecting the order in which data is read from the random access memory locations of time slot interchange random access memory data mode circuits 146 and 148.

Figure 6:
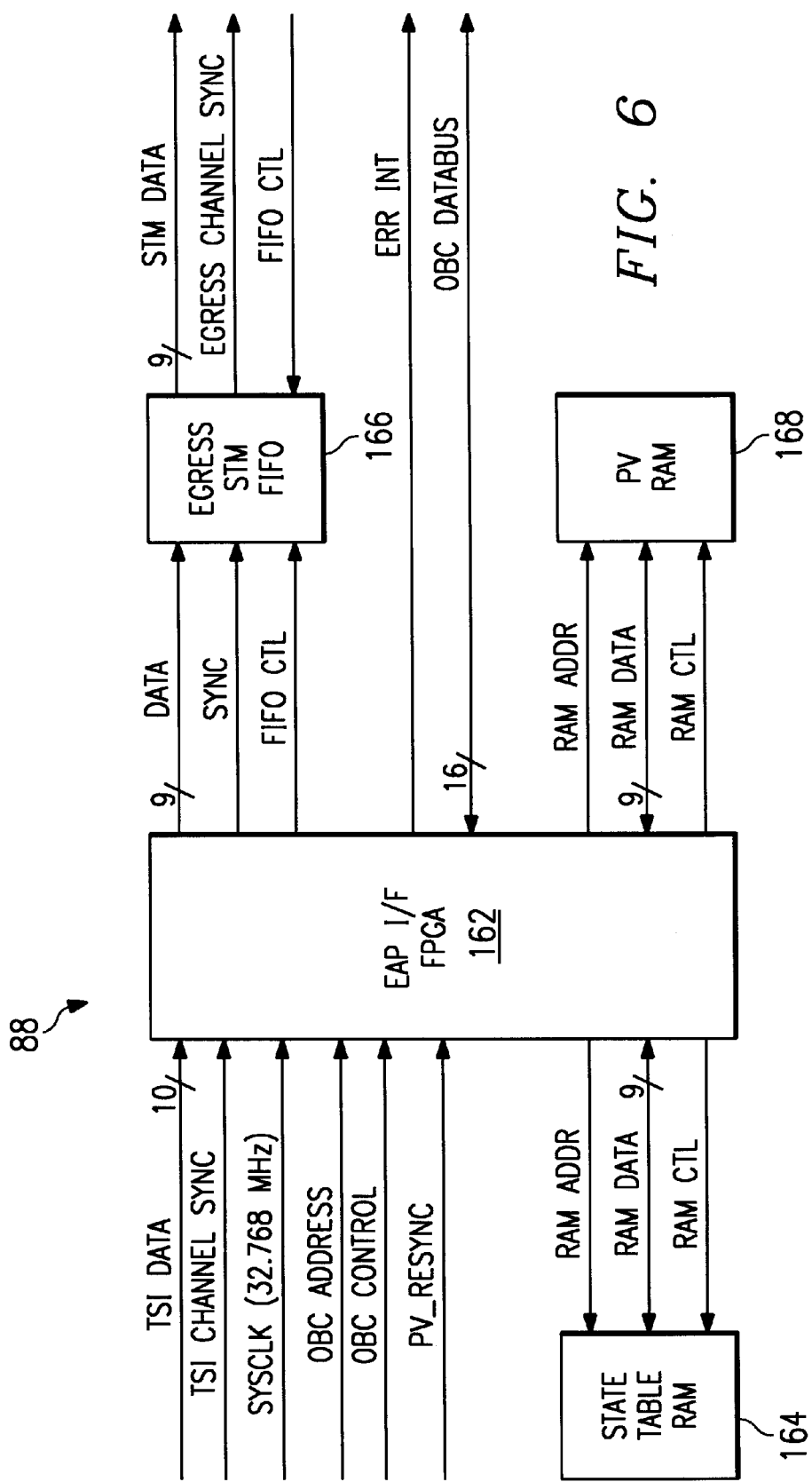
FIG. 6 is a block diagram of egress application interface circuit embodying concepts of the present invention.

FIG. 6 is a block diagram of egress application interface circuit 88 embodying concepts of the present invention. Egress application interface circuit 88 is a telecommunications data processing device, such as an Altera field programmable gate array, or other suitable field programmable gate arrays. Egress application interface circuit 88 includes field programmable gate array 162, state table random access memory circuit 164, egress buffer circuit 166, and path verification dual port memory circuit 168. Alternatively, egress application interface circuit 88 may include additional discrete components or a single component, such as an application-specific integrated circuit.

Field programmable gate array 162 is coupled to state table random access memory circuit 164, egress buffer circuit 166, and path verification dual port memory circuit 168. Field programmable gate array 162 receives DS-0 data from a 10-bit parallel data stream, a channel synchronization stream, and a clock stream from time slot interchange switch circuit 86. Field programmable gate array 162 also receives address and control data from the onboard controller circuit of the application circuit associated with bus interface system 80.

State table dual port random access memory circuit 164 is a dual port random access memory that receives data from field programmable gate array 162. As each byte of state data is written to state table random access memory circuit 164, even parity is calculated and stored with the data. State table random access memory circuit 164 is used by the path verification function of field programmable gate array 162 to track the state of each stream relative to the bit position of the path verification bit stream.

Path verification dual port memory circuit 168 is a dual port random access memory that is read by field programmable gate array 162 and which can be written to by the onboard controller circuit. As each byte is written to path verification dual port memory circuit 168, even parity is calculated and stored with the data. Path verification dual port memory circuit 168 contains the path verification code data for each DS-0 data channel. It is compared with the path verification code received on each DS-0 data channel to verify that the proper connections were made through the system.

Egress buffer circuit 166 is a first-in/first-out buffer that receives and stores DS-0 data from field programmable gate array 162. The DS-0 data is transmitted to the application circuit associated with bus interface system 80 upon receipt of control data generated by the application circuit associated with bus interface system 80.

Figure 7:
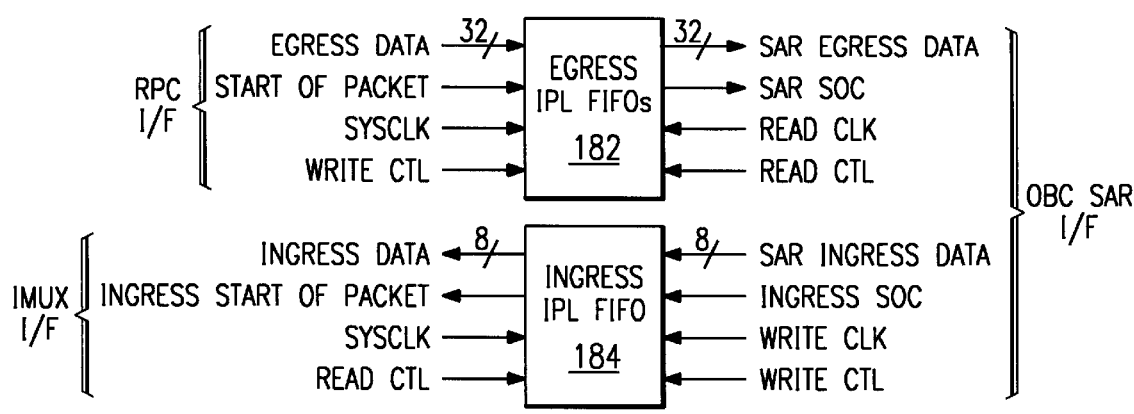
FIG. 7 is a block diagram of an iMPAX packet layer first-in, first-out buffer circuit embodying concepts of the present invention.

FIG. 7 is a block diagram of buffer circuit 90 embodying concepts of the present invention. Buffer circuit 90 comprises egress first-in/first-out buffer 182 and ingress first-in/first-out buffer 184. Alternatively, buffer circuit 90 may include additional discrete components or a single component, such as an application-specific integrated circuit.

Egress first-in/first-out buffer 182 and ingress first-in/first-out buffer 184 are first-in/first-out buffers that can store, for example, up to 1024 egress and ingress iMPAX packet layer datagrams. In addition, the egress iMPAX packet level datagrams are provided to the onboard controller segmentation and reassembly unit for the application circuit associated with bus interface system 80.

The onboard controller segmentation and reassembly unit also provides iMPAX packet layer datagrams to ingress first-in/first-out buffer 184. These datagrams are stored until they can be transmitted on ingress bus 60 by ingress multiplexer circuit 94, which controls the read operation of ingress first-in/first-out buffer 184.

Figure 8:
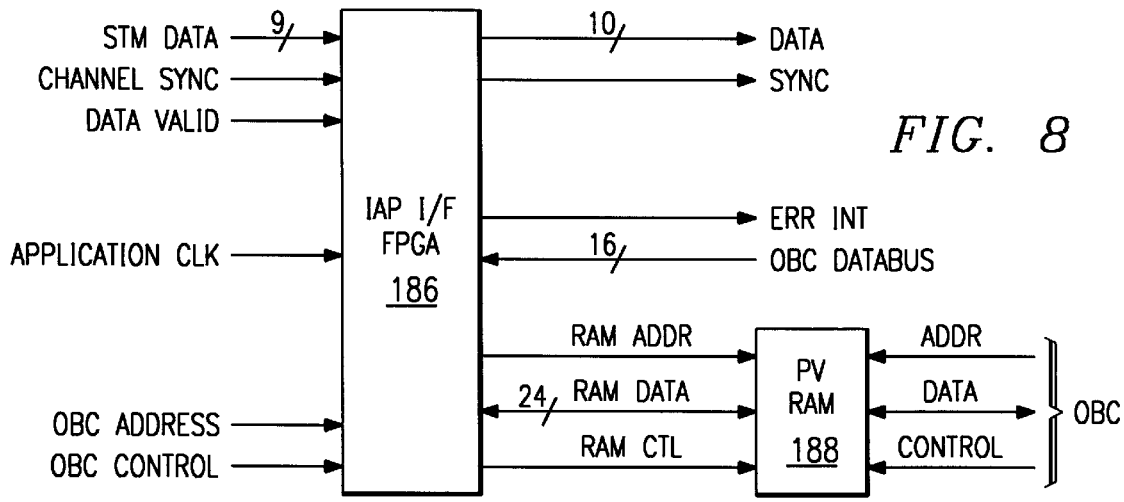
FIG. 8 is a block diagram of an ingress application interface circuit embodying concepts of the present invention.

FIG. 8 is a block diagram of ingress application interface circuit 92 embodying concepts of the present invention. Ingress application interface circuit 92 is a telecommunications data processing device that includes field programmable gate array 186 and dual port memory 188. Alternatively, ingress application interface circuit 92 may include additional discrete components or a single component, such as an application-specific integrated circuit.

Field programmable gate array 186 is a telecommunications data processing device, and may include an Altera field programmable gate array or other suitable components. Field programmable gate array 186 receives a 9-bit parallel data stream, a synchronization stream, a data validation stream, an application clock stream, an onboard controller address stream and an onboard controller control stream from the application circuit associated with bus interface system 80. Field programmable gate array 186 verifies parity over each byte of data, generates the path verification bit stream for each DS-0 data channel, generates parity over the 8-bit data and path verification bit, and concatenates the 8-bit data, path verification data, and parity data to form a ten-bit sample.

Dual port memory 188 is a dual port random access memory that is used to store the path verification code for each DS-0 data channel. Dual port memory 188 is accessed by the onboard controller circuit through a separate port to allow the onboard controller circuit to update the path verification table without disturbing normal processing by field programmable gate array 186.

Figure 9:
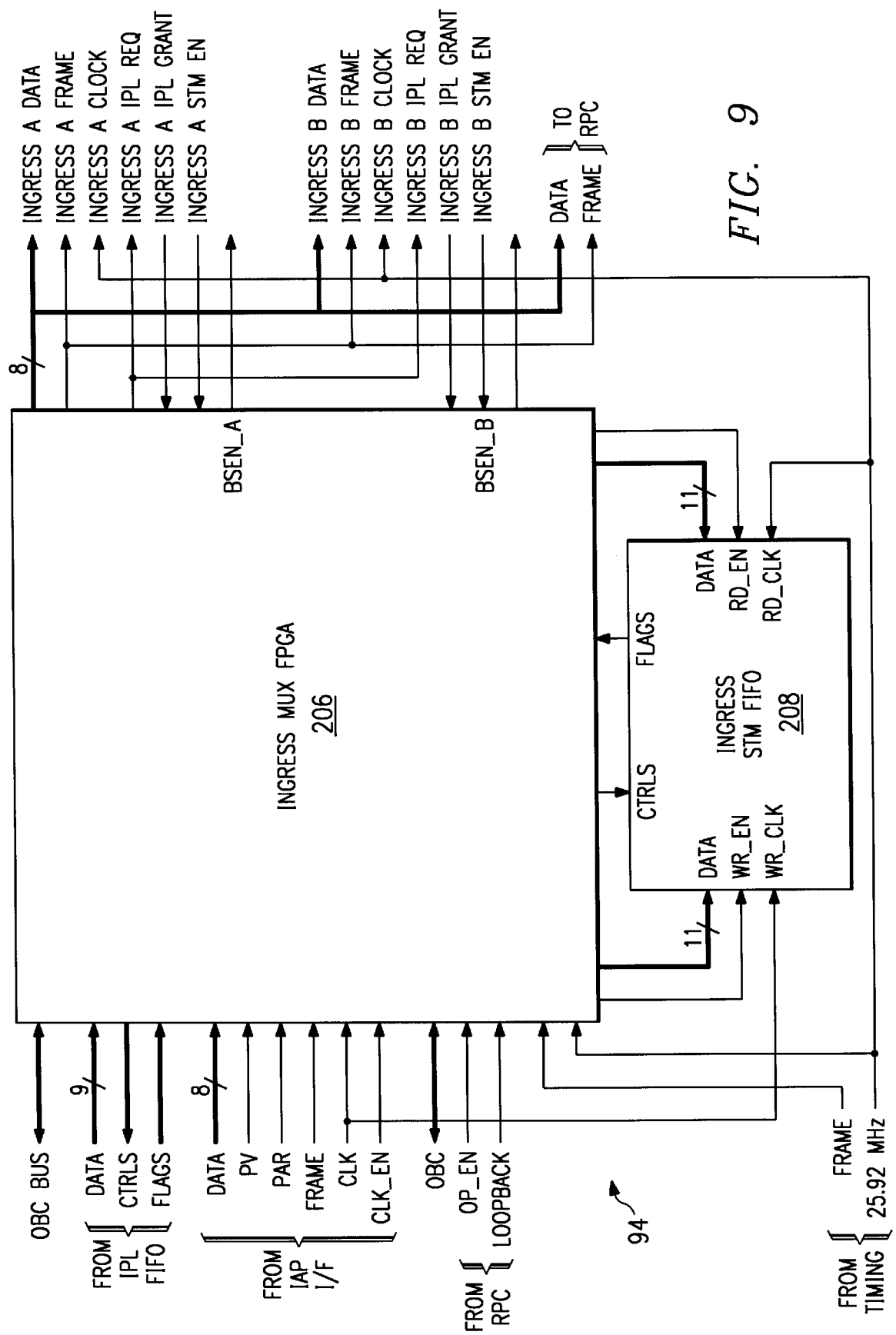
FIG. 9 is a block diagram of an ingress multiplexer circuit embodying concepts of the present invention.

FIG. 9 is a block diagram of ingress multiplexer circuit 94 embodying concepts of the present invention. Ingress multiplexer circuit 94 is a telecommunications data processing device that includes field programmable gate array 206 and first-in/first-out buffer 208. Ingress multiplexer circuit 94 may include other suitable components. Ingress multiplexer circuit 94 receives a data stream of outgoing synchronous transfer mode data and a data stream of outgoing asynchronous transfer mode data and combines the two data streams into a single outgoing data stream. Alternatively, ingress multiplexer circuit 94 may include additional discrete components or a single component, such as an application-specific integrated circuit.

Field programmable gate array 206 receives a 9-bit parallel data stream of asynchronous transfer mode data from buffer circuit 90 under control of control signals sent to buffer circuit 90 and flag signals received from buffer circuit 90. Field programmable gate array 206 also receives an 8-bit parallel data channel of synchronous transfer mode data, a path verification stream, a frame stream, a clock stream, a parity stream, and a clock enable stream from ingress application interface circuit 92. Field programmable gate array 206 monitors frame, parity, clock, and clock enable signals for the synchronous transfer mode data.

For the synchronous transfer mode data, field programmable gate array 206 monitors the incoming DS-0 data and writes it into first-in/first-out buffer 208 at the application clock rate. Field programmable gate array 206 reads the DS-0 data out of first-in/first-out buffer 208 according to a predetermined table of data at the system clock rate. The synchronous transfer mode data and asynchronous transfer mode data are multiplexed by transmitting synchronous transfer mode subframes in valid synchronous transfer mode bus slots according to a predetermined address correlation table, and by transmitting iMPAX packet layer datagrams in response to valid iMPAX packet layer grants from bus control circuit 44.

Arbitration errors are also monitored by all field programmable gate arrays of bus interface circuit 80, such as field programmable gate array 206. Synchronous transfer mode enables and iMPAX packet layer datagram grants asserted with an unexpected polarity will cause an arbitration error, as will synchronous transfer mode enable and iMPAX packet layer datagram grants asserted for the same bus slot or for an incorrect bus slot. The field programmable gate arrays also generate errors and patterns for diagnostic purposes.

Figure 10:
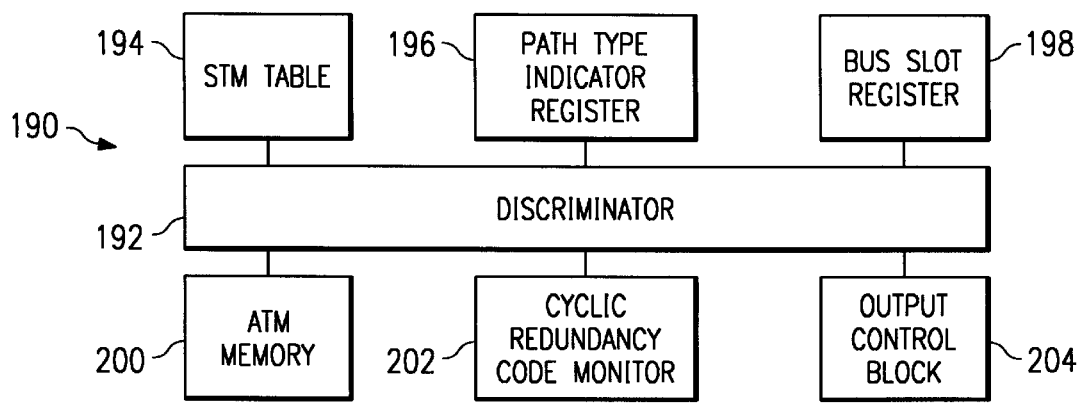
FIG. 10 is a block diagram of a system for plane selection embodying concepts of the present invention.

FIG. 10 is a block diagram of a system 190 for plane selection embodying concepts of the present invention. System 190 is used to select one of two or more datagrams for transmission to data formatter 84 and buffer circuit 90, and may alternatively be used in other applications in which one of two or more data packets is selected. Although system 190 is described in terms of two redundant planes, any number of redundant planes may be used without departing from the spirit or the scope of the invention.

System 190 includes discriminator 192, which is coupled to synchronous transfer mode data table 194, path type indicator register 196, bus slot register 198, iMPAX packet layer random access memory 200, cyclic redundancy code monitor 202, and output control block 204.

In operation, data packets comprising synchronous transfer mode datagrams, asynchronous transfer mode datagrams such as iMPAX packet layer datagrams, and idle datagrams are carried over egress bus 62 in 202 bus slot frames, where each bus slot carries one datagram. Each frame is transmitted in two or more redundant planes to prevent inadvertent interruption of data transmission caused by corruption of data. For each bus slot, discriminator 192 is operable to select one of two or more data packets, based upon data obtained from synchronous transfer mode data table 194, packet type indicator register 196, bus slot register 198, iMPAX packet layer random access memory 200, and cyclic redundancy code monitor 202.

Synchronous transfer mode data table 194 is a 202 entry table implemented in an internal dual-port random access memory structure of field programmable gate array 106. Synchronous transfer mode data table 194 may alternatively be implemented in other suitable memory devices. The 202 entries of synchronous transfer mode data table 194 correspond to the 202 egress bus slots of each egress bus 62, and carry data that indicates whether the corresponding bus slot may contain synchronous transfer mode data, which of the two or more planes is the preferred plane, whether a bus slot error has been generated, whether synchronous transfer mode plane selection is automatic, or other suitable data. This data may be used by discriminator 192 to select one of the two or more data packets for selection as the primary data packet.

Packet type indicator register 196 is a data memory register of field programmable gate array 106. Packet type indicator register 196 can hold four bits of data for each of the data packets of the two or more redundant planes of data. The data stored in packet type indicator register 196 is used by discriminator 192 to select one of the data packets of the two or more planes of data.

Bus slot register 198 is a data memory register of field programmable gate array 106. Bus slot register 198 can hold eight bits of data for each of the data packets of the two or more redundant planes of data. The data stored in bus slot register 198 is used by discriminator 192 to select one of the data packets of the two or more planes of data.

iMPAX packet layer random access memory 200 is iMPAX packet layer random access memory 108 of FIG. 3, but may alternatively be other suitable memory devices. iMPAX packet layer random access memory 200 is used to store data corresponding to the destination address data for each of the asynchronous transfer mode data packets of the two or more redundant planes of data. The data stored in iMPAX packet layer random access memory 200 is used by discriminator 192 to select one of the data packets of the two or more planes of data.

Cyclic redundancy code monitor 202 calculates a cyclic redundancy code for each packet of data received for each of the two or more redundant planes of data, in accordance with a predetermined algorithm. The calculated cyclic redundancy code is compared to a previously calculated cyclic redundancy code residing in a predetermined field in the packet itself, and an error code is generated if the two cyclic redundancy codes are not identical. This error code is transmitted to discriminator 192 and is used to select one of the data packets of the two or more planes of data.

Output control block 204 is coupled to first-in, first-out buffers 112 and 114 of FIG. 4 and buffer circuit 90 of FIG. 2. Output control block 204 receives data from discriminator 192 and generates control signals that cause data to be transferred by redundant path combiner circuit 82 to first-in, first-out buffers 112 and 114 and buffer circuit 90.

In operation, incoming datagrams or packets of data are received at egress front end processor A plane 102 and B plane 104. These packets are then transferred to field programmable gate array 106, and are selectively and controllably monitored by synchronous transfer mode data table 194, path type indicator register 196, bus slot register 198, iMPAX packet layer random access memory 200, and cyclic redundancy code monitor 202. Discriminator 192 receives data stored in or generated by synchronous transfer mode data table 194, path type indicator register 196, bus slot register 198, iMPAX packet layer random access memory 200, and cyclic redundancy code monitor 202, and selects one of the two or more redundant data packets.

Figure 11:
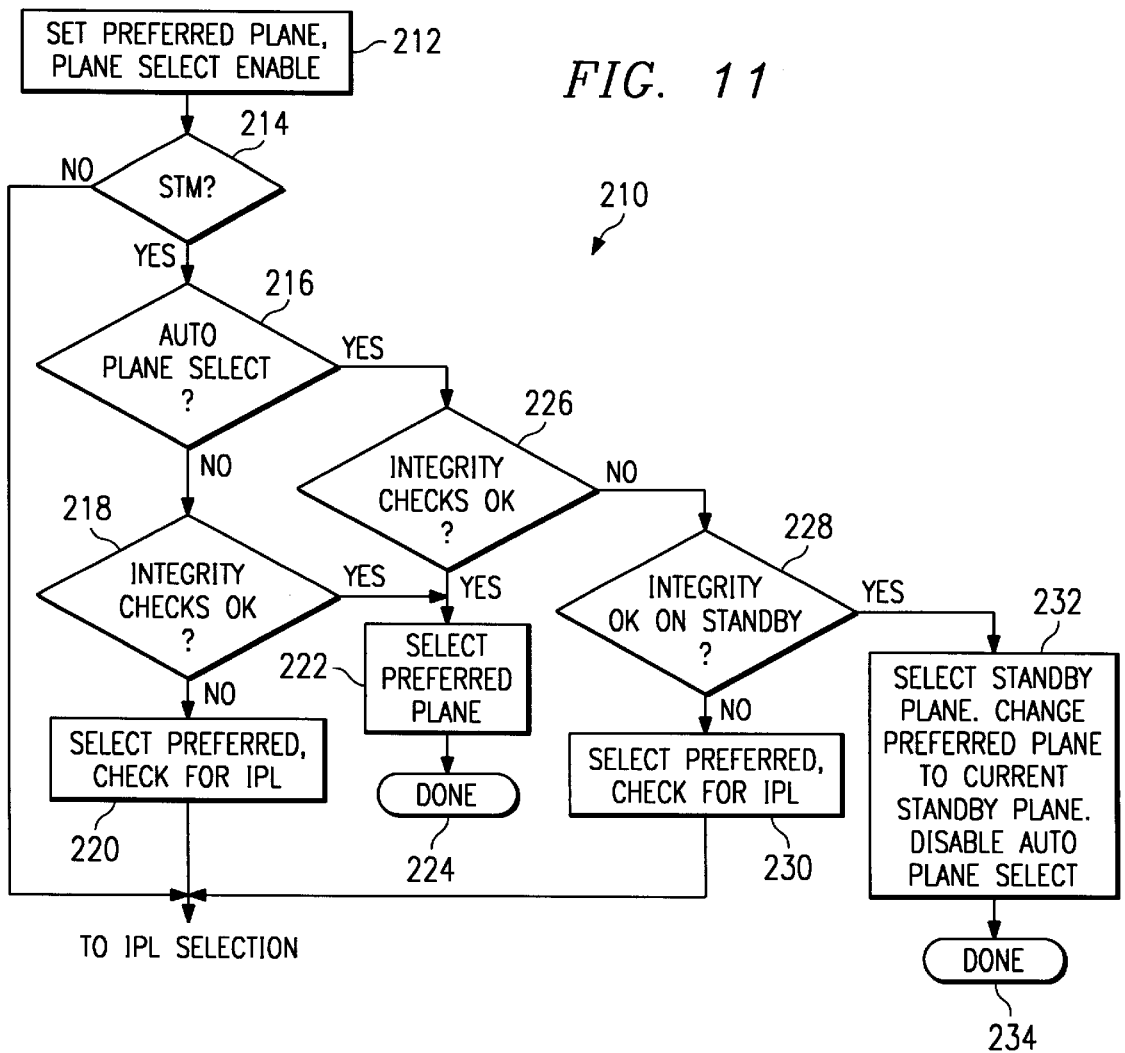
FIG. 11 is a flow chart of a method for selecting a synchronous transfer mode datagram in accordance with the present invention.

FIG. 11 is a flow chart of a method 210 for selecting a synchronous transfer mode datagram in accordance with the present invention. Method 210 may be executed by discriminator 192 or other suitable software or hardware systems. Although method 210 is described in terms of two redundant planes, any number of redundant planes may be used without departing from the spirit or the scope of the invention.

Method 210 begins at step 212, where the preferred plane and plane select enable bits are programmed on a slot by slot basis. The preferred plane and plane select enable bits may be stored in a suitable table, such as synchronous transfer mode data table 194 of FIG. 10. At step 214, it is determined whether data stored in the STM table indicates that the data packet for the corresponding slot is STM data. If the data stored is the STM table indicates that the data is not STM data, the method skips the STM selection process and proceeds to step 242. If the data stored in the STM table indicates that the data is STM data, the method proceeds to step 216, where it is determined whether plane selection is to be automatic, such as by checking plane select enable data stored in the synchronous transfer mode data table.

If the plane selection is determined to be automatic at step 216, the method proceeds to step 226, where integrity checks are performed on the data packet for the plane indicated by the preferred plane data in the synchronous transfer mode data table. For example, integrity checks may be performed by discriminator 192 of FIG. 10. If the integrity checks are determined to be acceptable at step 226, the method proceeds to step 222, where the data packet for the preferred plane is selected in accordance with data stored in the synchronous transfer mode data table. The method then ends at step 224.

If the integrity checks performed at step 226 are determined to be unacceptable, then the method proceeds to step 228, where the integrity checks are performed on the data packet for the standby data plane. An error code is generated that indicates that the preferred plane did not produce acceptable integrity checks. The standby data plane is a data plane that is not indicated to be the preferred data plane in the synchronous transfer mode data table. If the integrity checks for the data packet for the standby data plane are determined to be acceptable at step 228, the method proceeds to step 232, where the data packet for the standby plane is selected for subsequent transmission. In addition, the preferred plane data in the STM table for the particular bus slot is changed to the current standby plane to make it the new preferred plane. Also, the automatic-plane-select data in the STM table for the particular bus slot is disabled to prevent automatically switching back to the original plane which failed its integrity checks. The method then ends at step 234.

If the integrity checks on the data packet of the standby data plane performed at step 228 are determined to be unacceptable, the method proceeds to step 230, where the data packet for the preferred data plane is selected. An error code is generated that indicates that the standby planes did not produce acceptable integrity checks. The method then proceeds to step 242 of FIG. 12 to determine whether the data packet contains improperly routed asynchronous transfer mode data.

If the plane selection is determined to not be automatic at step 216, the method proceeds to step 218, where integrity checks are performed on the data packet for the preferred data plane. If the integrity checks are acceptable, the method proceeds to step 222, where the data packet for the preferred data plane is selected. Otherwise, the method proceeds to step 220, where the data packet for the preferred data plane is selected. An error code is generated that indicates that none of the planes produced acceptable integrity checks. The method then proceeds to step 242 of FIG. 12 to determine whether the data packet contains improperly routed asynchronous transfer mode data.

Figure 12:
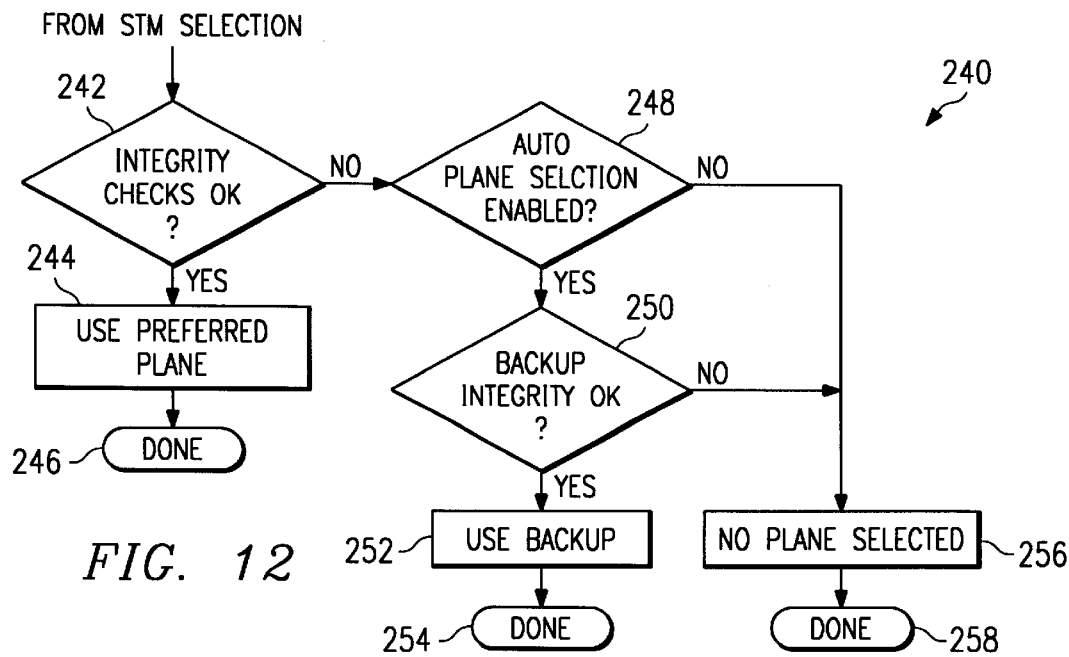
FIG. 12 is a flow chart of a method for selecting an asynchronous transfer mode datagram in accordance with the present invention.

FIG. 12 is a flow chart of a method 240 for selecting an asynchronous transfer mode datagram in accordance with the present invention. Although method 240 is described in terms of two redundant planes, any number of redundant planes may be used without departing from the spirit or the scope of the invention.

Method 240 begins at step 242, where integrity checks are performed on the data packet for the preferred data plane. For example, the integrity checks may be performed by discriminator 192 of FIG. 10, and may include verifying that the packet type is consistent with an asynchronous transfer mode data packet such as an iMPAX packet layer datagram.

If the integrity checks performed at step 242 are acceptable, then the method proceeds to step 244, where the data packet for the preferred plane is selected. The method then ends at step 246. If the integrity checks performed at step 242 are not acceptable, the method proceeds to step 248, where it is determined whether automatic plane selection has been enabled. If automatic plane selection has not been enabled, the method proceeds to step 256, where no data is selected. In addition, an error code is generated that indicates that the integrity check on the data packet was determined to be not acceptable.

If it is determined that automatic plane selection has been enabled at step 248, the method proceeds to step 250, where integrity checks are performed on the data packet of a backup data plane. If the integrity checks for the data packet of the backup data plane are acceptable, the method proceeds to step 252. At step 252, the data packet for the backup data plane is selected. The method then ends at step 254. If the integrity of the data packet for the backup data plane is determined to be not acceptable, the method proceeds to step 256.

In operation, two or more redundant planes of data are received at a redundant path combiner circuit. The data of each redundant plane is transmitted in data packets or datagrams having a suitable predetermined bit structure. The redundant path combiner determines whether the data is synchronous transfer mode data or asynchronous transfer mode data, and performs integrity checks on the data packets. These integrity checks include verifying that the data is synchronous transfer mode data or asynchronous transfer mode data, performing a cyclic redundancy check on the data to ensure that it has not been corrupted, and other suitable integrity checks. The redundant path combiner circuit then transmits the data packet to a synchronous transfer mode data buffer or an asynchronous transfer mode data buffer, as appropriate. Error codes may be generated if the integrity checks performed by the redundant path combiner circuit are not acceptable. These error codes may be transmitted to an appropriate error monitoring system so that fault isolation and correction may be performed.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A system for selecting one of two or more parallel planes of data comprising:
   a first data buffer coupled to a first data bus corresponding to a first redundant plane carrying a plurality of datagrams, each datagram being carried in a bus slot of a data stream transferred by the first redundant plane, each datagram being one of at least a first data type and a second data type, the first data buffer operable to selectively receive and store datagrams of the first data type from the first data bus;
   a second data buffer coupled to a second data bus corresponding to a second redundant plane carrying the plurality of datagrams, each datagram being carried in a bus slot of a data stream transferred by the second redundant plane, the second data buffer operable to selectively receive and store datagrams of the first data type from the second data bus; and
   a selection controller coupled to the first data buffer and the second data buffer, the selection controller operable to analyze the datagram stored in the first data buffer and the datagram stored in the second data buffer, the selection controller operable to select one of the datagrams stored in the first data buffer and the second data buffer to be the primary datagram on a bus slot by bus slot basis, the selection controller operable to output the primary datagram from the corresponding one of the first and second data buffers.

2. The system of claim 1 further comprising:
   a synchronous transfer mode data table coupled to the selection controller, the synchronous transfer mode data table operable to store data identifying synchronous transfer mode data slots; and
   wherein the selection controller is operable to select one of the datagrams stored in the first data buffer and the second data buffer to be the primary datagram based upon data stored in the synchronous transfer mode data table.

3. The system of claim 1 further comprising:
   a packet type indicator register coupled to the selection controller, the packet type indicator register operable to store a packet type code from a selected bus slot; and
   wherein the selection controller is operable to select one of the datagrams stored in the first data buffer and the second data buffer to be the primary datagram based upon data stored in the packet type indicator register.

4. The system of claim 1 further comprising:
   a bus slot register coupled to the selection controller, the bus slot register operable to store a bus slot number for a selected bus slot; and
   wherein the selection controller is operable to select one of the datagrams stored in the first data buffer and the second data buffer to be the primary datagram based upon data stored in the bus slot register.

5. The system of claim 1 further comprising:
   an asynchronous transfer mode address data memory coupled to the selection controller, the asynchronous transfer mode data memory operable to store asynchronous transfer mode datagram address data; and
   wherein the selection controller is operable to select one of the datagrams stored in the first data buffer and the second data buffer to be the primary datagram based upon address data stored in the asynchronous transfer mode address data memory.

6. The system of claim 1 further comprising:
   a cyclical redundancy code monitor coupled to the first data buffer and the second data buffer, the cyclical redundancy code monitor operable to process the datagram stored in the first data buffer and the datagram stored in the second data buffer and to generate data that is a function of the data comprising each datagram; and
   wherein the selection controller is operable to select one of the datagrams stored in the first data buffer and the second data buffer to be the primary datagram based upon data generated by the cyclical redundancy code monitor.

7. The system of claim 1 further comprising:
   a synchronous transfer mode data table coupled to the selection controller, the synchronous transfer mode data table operable to store data identifying synchronous transfer mode data slots;
   a packet type indicator register coupled to the selection controller, the packet type indicator register operable to store a packet type code from a selected bus slot;
   a bus slot register coupled to the selection controller, the bus slot register operable to store a bus slot number for a selected bus slot;
   an asynchronous transfer mode address data memory coupled to the selection controller, the asynchronous transfer mode data memory operable to store asynchronous transfer mode address data;
   a cyclical redundancy code monitor coupled to the first data buffer and the second data buffer, the cyclical redundancy code monitor operable to process the datagram stored in the first data buffer and the datagram stored in the second data buffer and to generate data that is a function of the data comprising each datagram; and
   wherein the selection controller is operable to select one of the datagrams stored in the first data buffer and the second data buffer to be the primary datagram based upon data stored in the synchronous transfer mode data table, the packet type indicator register, the bus slot register, the asynchronous transfer mode address data memory, and data generated by the cyclical redundancy code monitor.

8. A system for selecting one of two or more parallel planes of data comprising:
   a first data buffer coupled to a first data bus carrying a plurality of datagrams, each datagram being carried in a bus slot of a data stream transferred by the first redundant plane, each datagram being one of at least a first data type and a second data type, the first data buffer operable to selectively receive and store datagrams of the first data type from the first data bus;

a second data buffer coupled to a second data bus carrying the plurality of datagrams, each datagram being carried in a bus slot of a data stream transferred by the second redundant plane, the second data buffer operable to selectively receive and store datagrams of the first data type from the second data bus;

a selection controller coupled to the first data buffer and the second data buffer, the selection controller operable to analyze the datagram stored in the first data buffer and the datagram stored in the second data buffer and to select one of the datagrams stored in the first data buffer and the second data buffer to be the primary datagram on a bus slot by bus slot basis;

a synchronous transfer mode data table coupled to the selection controller, the synchronous transfer mode data table operable to store data identifying synchronous transfer mode data slots;

an asynchronous transfer mode address data memory coupled to the selection controller, the asynchronous transfer mode address data memory operable to store asynchronous transfer mode datagram address data; and wherein the selection controller is operable to select one of the datagrams stored in the first data buffer and the second data buffer to be the primary datagram for output based upon data stored in the asynchronous transfer mode address data memory and the synchronous transfer mode data table.

9. The system of claim 8 further comprising:

a bus slot register coupled to the selection controller, the bus slot register operable to store a bus slot number for a selected bus slot; and wherein the selection controller is operable to select one of the datagrams stored in the first data buffer and the second data buffer to be the primary datagram based upon data stored in the bus slot register.

10. The system of claim 8 further comprising:

a cyclical redundancy code monitor coupled to the first data buffer and the second data buffer, the cyclical redundancy code monitor operable to process the datagram stored in the first data buffer and the datagram stored in the second data buffer and to generate data that is a function of the data comprising each datagram; and wherein the selection controller is operable to select one of the datagrams stored in the first data buffer and the second data buffer to be the primary datagram based upon data generated by the cyclical redundancy code monitor.

11. The system of claim 8 further comprising:

a packet type indicator register coupled to the selection controller, the packet type indicator register operable to store a packet type code from a selected bus slot; and wherein the selection controller is operable to select one of the datagrams stored in the first data buffer and the second data buffer to be the primary datagram based upon data stored in the packet type indicator register.

12. A method for selecting one of two or more planes of data comprising:

receiving a plurality of datagrams carried over bus slots of both first and second redundant planes, each datagram being carried in a bus slot of a data stream transferred by the first and second redundant planes, each datagram being one of at least two data types;

storing a datagram of the first data type from each of the first and second redundant planes in an associated one of a plurality of data buffers;

analyzing each datagram of the first data type with a selection controller; and selecting one of the datagrams of the first data type to be the primary datagram on a bus slot by bus slot basis; and transmitting the primary datagram to an output data buffer.

13. The method of claim 12 wherein analyzing each datagram further comprises:

storing packet type indicator information of the datagram;

comparing the packet type indicator information of the datagram with data stored in a STM table; and generating an error code if the packet type indicator information of the datagram does not correlate with the data stored in the STM table.

14. The method of claim 12 wherein analyzing each datagram further comprises:

storing bus slot information indicating a current bus slot of the datagram being processed;

comparing the bus slot information with internal data in the datagram indicating the current bus slot of the datagram being processed; and generating an error code if the bus slot information does not correlate with the internal data of the datagram indicating the current bus slot of the datagram being processed.

15. The method of claim 12 wherein analyzing each datagram further comprises:

reading data stored in an asynchronous transfer mode address data memory which corresponds with data stored in a predetermined field of the datagram to determine if the datagram is addressed to the local application.

16. The method of claim 12 wherein analyzing each datagram further comprises:

generating a cyclic redundancy check code for the datagram;

comparing the cyclic redundancy check code with data stored in a predetermined field of the datagram; and generating an error code if the data generated by the cyclic redundancy check monitor does not correlate with the data stored in the predetermined field of the datagram.

17. A method for selecting one of two or more planes of data comprising:

receiving a plurality of datagrams from each of a plurality of planes, each datagram being one of at least a first data type and a second data type;

storing a datagram of the first data type from each of a plurality of planes in a data buffer;

analyzing each datagram of the first data type with a selection controller; and determining whether a datagram of the first data type has an error;

generating an error code for a datagram of the first data type determined to have an error;

selecting one of the datagrams of the first data type to be the primary datagram on a per datagram basis;

transmitting the primary datagram to an output data buffer;

determining a preferred plane and a standby plane;

selecting the primary datagram of the preferred plane if no error codes have been generated for the primary datagram of the preferred plane; and selecting a primary datagram of the standby plane if error codes have been generated for the primary datagram of the preferred plane, if no error codes have been generated for the primary datagram of the standby plane, and if the selection of the standby plane is enabled;

providing the primary datagrams from the preferred and standby planes on a bus slot by bus slot basis.

* * * * *